United States Patent
Li

(10) Patent No.: US 9,837,899 B2
(45) Date of Patent: Dec. 5, 2017

(54) POWER CONVERTER WITH IMPROVED LOAD TRANSIENT RESPONSE AND ASSOCIATED CONTROL METHOD

(71) Applicant: Chengdu Monolithic Power Systems Co., Ltd., Chengdu (CN)

(72) Inventor: Yike Li, Chengdu (CN)

(73) Assignee: Chengdu Monolithic Power Systems Co., Ltd., Chengdu (CN)

( * ) Notice: Subject to any disclaimer, the term of this patent is extended or adjusted under 35 U.S.C. 154(b) by 0 days.

(21) Appl. No.: 15/399,647

(22) Filed: Jan. 5, 2017

(65) Prior Publication Data

US 2017/0201174 A1    Jul. 13, 2017

(30) Foreign Application Priority Data

Jan. 7, 2016  (CN) .......................... 2016 1 0008434

(51) Int. Cl.
*G05F 1/00*  (2006.01)
*H02M 3/157*  (2006.01)
*H02M 1/08*  (2006.01)
*H02M 1/00*  (2006.01)

(52) U.S. Cl.
CPC ............. *H02M 3/157* (2013.01); *H02M 1/08* (2013.01); *H02M 2001/0009* (2013.01)

(58) Field of Classification Search
CPC ......... H02M 3/156; H02M 2003/1552; H02M 3/155; H02M 3/145; H02M 3/158; H02M 3/1588; G05F 1/613
USPC ........... 323/222, 224, 272, 282–290; 363/17, 363/21.04, 41, 89, 97
See application file for complete search history.

(56) References Cited

U.S. PATENT DOCUMENTS

| | | | |
|---|---|---|---|
| 9,231,574 B2 | 1/2016 | Nguyen et al. | |
| 2012/0146608 A1* | 6/2012 | Wan .................. | H02M 3/156 323/284 |
| 2015/0061628 A1* | 3/2015 | Nguyen .............. | H02M 3/1563 323/282 |

* cited by examiner

*Primary Examiner* — Adolf Berhane
*Assistant Examiner* — Afework Demisse
(74) *Attorney, Agent, or Firm* — Perkins Coie LLP

(57) ABSTRACT

A power converter including a load transient response control module and associated method for controller the power converter. The load transient response control module detects a deviation of an output voltage of the power converter from a desired value of the output voltage and compares the deviation with a first threshold to provide a load response control signal indicating whether load transient change occurs. If the deviation is lower than the first threshold, a clock signal of the power converter is reset and a main switch of the power converter is maintained on during the period when the deviation is lower than the first threshold.

16 Claims, 6 Drawing Sheets

POWER CONVERTER WITH IMPROVED LOAD TRANSIENT RESPONSE AND ASSOCIATED CONTROL METHOD

CROSS-REFERENCE TO RELATED APPLICATION(S)

This application claims the benefit of CN application No. 201610008434.5 filed on Jan. 7, 2016 and incorporated herein by reference.

TECHNICAL FIELD

This disclosure relates generally to power converters, and more particularly but not exclusively relates to load transient response control of switching power converters.

BACKGROUND

Switching power converters are widely use in various electronic devices as power supplies for providing appropriate supply voltage or supply current to the electronic devices.

Most switching power converters are employed to convert an input voltage into an appropriate output voltage through controlling a switch module to switch on and off, thereby regulating power transmitted to a load.

However, when the load changes rapidly, the output voltage may widely vary. For instance, the output voltage may drop largely if the load gets heavier and requires a larger current. In this circumstance, it is desired that the load transient response performance (i.e. the transient response capability of the output voltage to the change in the current required by the load) of the switching power converters can be improved. In other words, it is desired that the output voltage can be regulated to restore to its desired value as quickly as possible.

SUMMARY

In accomplishing the above and other objects, there has been provided, in accordance with an embodiment of the present invention, a power converter comprising a load transient response control module. The power converter may have an input port configured to receive an input voltage and an output port configured to provide an output voltage. The power converter may further comprise a switch module, a pulse width modulation module, a clock generation module and a logic control module.

The switch module may comprise a main switch configured to switch on and off in response to a driving signal to convert the input voltage into the output voltage, a switching current flowing through the switch module during the on and off switching of the switch module.

The pulse width modulation module may be configured to respectively receive a first feedback signal indicative of the output voltage, a reference signal indicative of a desired value of the output voltage and a second feedback signal indicative of the switching current, and to generate an off trigger signal based on the first feedback signal, the reference signal and the second feedback signal.

The load transient response control module may be configured to detect a deviation of the output voltage from the desired value of the output voltage, and to compare the deviation with a first threshold to generate a load response control signal.

The clock generation module may be configured to provide a clock signal and to reset the clock signal in response to the load response control signal when the deviation is lower than the first threshold.

The logic control module may be configured to receive the off trigger signal, the load response control signal and the clock signal, and to generate a pulse width modulated signal based on the off trigger signal and the clock signal, and further to generate the driving signal based on the pulse width modulated signal and the load response control signal; wherein the logic control module is further configured to trigger the driving signal to turn the main switch on in response to the clock signal, and to trigger the driving signal to turn the main switch off in response to the off trigger signal; and wherein the logic control module is further configured to maintain the driving signal to drive the main switch on during the period when the deviation is lower than the first threshold in response to the load response control signal.

There has also been provided, in accordance with an embodiment of the present invention, a method for controlling a power converter, wherein the power converter comprising a main switch configured to switch on and off to convert an input voltage to an output voltage. The method according to an embodiment of the present invention may comprise: monitoring a deviation of the output voltage from its desired value, and comparing the deviation with a first threshold to generate a load response control signal; resetting a clock signal of the power converter in response to the load response control signal once the deviation is lower than the first threshold; and driving and maintaining the main switch on based on the load response control signal during the period when the deviation is lower than the first threshold.

BRIEF DESCRIPTION OF THE DRAWINGS

The following detailed description of various embodiments of the present invention can best be understood when read in conjunction with the following drawings, in which the features are not necessarily drawn to scale but rather are drawn as to best illustrate the pertinent features.

DETAILED DESCRIPTION

Various embodiments of the present invention will now be described. In the following description, some specific details, such as example circuits and example values for these circuit components, are included to provide a thorough understanding of the embodiments. One skilled in the relevant art will recognize, however, that the present invention can be practiced without one or more specific details, or with other methods, components, materials, etc. In other instances, well-known structures, materials, processes or operations are not shown or described in detail to avoid obscuring aspects of the present invention.

Throughout the specification and claims, the term "coupled," as used herein, is defined as directly or indirectly connected in an electrical or non-electrical manner. The terms "a," "an," and "the" include plural reference, and the term "in" includes "in" and "on". The phrase "in one embodiment," as used herein does not necessarily refer to the same embodiment, although it may. The term "or" is an inclusive "or" operator, and is equivalent to the term "and/or" herein, unless the context clearly dictates otherwise. The term "based on" is not exclusive and allows for being based on additional factors not described, unless the context clearly dictates otherwise. The term "circuit" means at least either a single component or a multiplicity of components, either active and/or passive, that are coupled together to provide a desired function. The term "signal" means at least one current, voltage, charge, temperature, data, or other signal. Where either a field effect transistor ("FET") or a bipolar junction transistor ("BJT") may be employed as an embodiment of a transistor, the scope of the words "gate", "drain", and "source" includes "base", "collector", and "emitter", respectively, and vice versa. Those skilled in the art should understand that the meanings of the terms identified above do not necessarily limit the terms, but merely provide illustrative examples for the terms.

Figure 1:
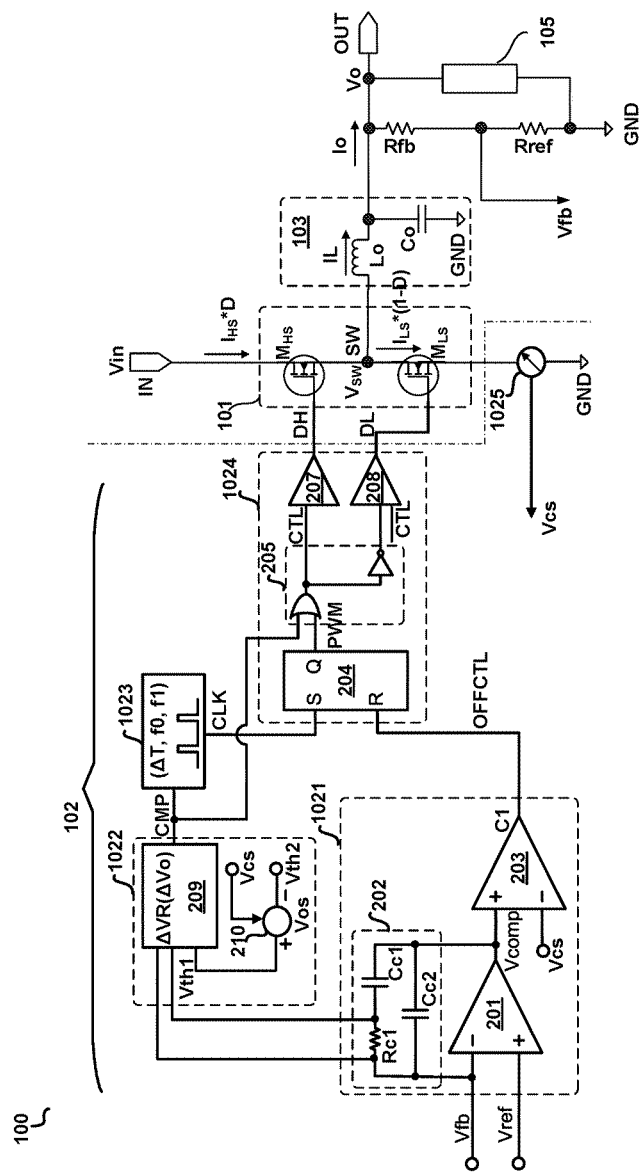
FIG. 1 illustrates a block diagram of a power converter 100 in accordance with an embodiment of the present invention.

FIG. 1 illustrates a block diagram of a power converter 100 in accordance with an embodiment of the present invention. The power converter 100 may comprise: an input port IN configured to receive an input voltage Vin; an output port OUT configured to provide an output voltage Vo and an output current Io for supplying a load 105; a switch module 101; and a control module 102. The switch module 101 may at least comprise a main switch (e.g. the main switch $M_{HS}$ illustrated in FIG. 1). The switch module 101 may have a first terminal coupled to the input port IN, a second terminal coupled to the output port OUT and a control terminal configured to receive a driving signal (e.g. at least comprising the high side driving signal DH illustrated in FIG. 1). The switch module 101 is configured to conduct on and off switching based on the driving signal to convert the input voltage Vin into the output voltage Vo. The control module 102 may comprise a first control input terminal, a second control input terminal, a third control input terminal and a first control output terminal, wherein the first control input terminal is configured to monitor/receive a first feedback signal Vfb indicative of the output voltage Vo, the second control input terminal is configured to monitor/receive a second feedback signal Vcs indicative of the output current Io, the third control input terminal is configured to receive a reference signal Vref indicative of a desired value of the output voltage Vo. The control module 102 is configured to provide the driving signal to the switch module 101 at least based on the first feedback signal Vfb, the second feedback signal Vcs and the reference signal Vref. In an embodiment, the control module 102 is configured to at least provide the high side driving signal DH at the first control output terminal based at least on the first feedback signal Vfb, the second feedback signal Vcs and the reference signal Vref, wherein the high side driving signal DH is configured to control the main switch $M_{HS}$ to conduct on and off switching.

In accordance with the exemplary embodiment of FIG. 1, the switch module 101 of the power converter 100 may further comprise a second switch $M_{LS}$. The main switch $M_{HS}$ and the second switch $M_{LS}$ are coupled in series between the input port IN and a reference ground GND, and the common connection of the main switch $M_{HS}$ and the second switch $M_{LS}$ forms a switching node SW which can be considered as the second terminal of the switch module 101. The main switch $M_{HS}$ may comprise a controllable switching device, e.g. illustrated as a MOSFET in FIG. 1. The second switch $M_{LS}$ may also comprise a controllable switching device, e.g. illustrated as a MOSFET in FIG. 1. In the embodiment where the second switch $M_{LS}$ comprises the controllable switching device, the control module 102 may further comprise a second control output terminal configured to provide a low side driving signal DL to the switch module 101 to drive the second switch $M_{LS}$, wherein the low side driving signal DL is an logic complementary signal to the high side driving signal DH. In other embodiment, the second switch $M_{LS}$ may comprise a diode in stead of a MOSFET. In this case, the control module 102 does not provide the low side driving signal DL. With the control of the control module 102, the main switch $M_{HS}$ and the second switch $M_{LS}$ are driven to switch on and off complementarily, i.e. when the main switch $M_{HS}$ is switched on, the second switch $M_{LS}$ is switched off, and vice versa. The switch module 101 provides a switching signal $V_{SW}$ at the switching node SW.

In accordance with an embodiment of the present invention, the power converter 100 may further comprise a filtering module 103. The filtering module 103 is coupled to the input port IN when the main switch $M_{HS}$ is on to store energy, and is coupled to the output port OUT when the main switch $M_{HS}$ is off to deliver energy to the load 105. In the example of FIG. 1, the filtering module 103 is illustrated to comprise an inductive power storage device Lo and a capacitive power storage device Co. The inductive power storage device Lo is at least coupled to the switch module 101, for instance, in the embodiment of FIG. 1, a first terminal of the inductive power storage device Lo is coupled to the switching node SW of the switch module 101, a second terminal of the inductive power storage device Lo is coupled to the output port OUT. When the main switch $M_{HS}$ is on, the inductive power storage device Lo is connected to the input port IN to store energy. When the main switch $M_{HS}$ is off, the inductive power storage device Lo is disconnected from the input port IN, and is connected to the output port OUT to discharge energy. An inductor current IL is generated and flows through the inductive power storage device Lo during the storage and discharge of energy. The capacitive power storage device Co has a first terminal coupled to the output port OUT and a second terminal connected to the reference ground GND and is configured to filter the output signal (e.g. the switching signal $V_{SW}$) of the switch module 101 to provide the smoothed output voltage Vo. The exemplary embodiment of the power converter 100 shown in FIG. 1 is based on buck (step-down) type converter topology and may be referred to as a buck (step down) power converter. One of ordinary skill in the art should understand that the circuits and method taught herein may apply to other types of converter, such as boost (step-up) power converter, buck-boost power converter, flyback power converter etc.

In accordance with an embodiment of the present invention, the power converter 100 may further comprise a feedback module, which is configured to monitor the output voltage Vo and to provide the first feedback signal Vfb. For instance, in the example of FIG. 1, the feedback module is illustrated to comprise a first feedback resistor Rfb and a second feedback resistor Rref connected in series between the output port OUT and the reference ground GND. The first feedback signal Vfb is provided from the common connection of the first feedback resistor Rfb and the second feedback resistor Rref. In other embodiments, the feedback module may comprise other circuit elements. In certain embodiment, the power converter 100 may not comprise the feedback module and the output voltage Vo may be provided as the first feedback signal Vfb.

In accordance with an embodiment of the present invention, the control module 102 is configured to perform peak current control pulse width modulation mode to control the on and off switching of the switch module 101. In an embodiment, the control module 102 is configured to at least provide a high side driving signal DH to the main switch $M_{HS}$ of the switch module 101 to control the on and off switching of the main switch $M_{HS}$. The switch module 101 may be considered as on when the main switch $M_{HS}$ is on, and considered as off when the main switch $M_{HS}$ is off. A fraction of time that the main switch $M_{HS}$ is switched on during the total time of an on and off switching cycle may be referred to as an on duty cycle of the switch module 101 or the power converter 100, denoted by D for example. The control module 102 regulates the output voltage Vo through regulating the on duty cycle D. A switching current including a high side switching current $I_{HS}$ flowing through the main switch $M_{HS}$ and a low side switching current $I_{LS}$ flowing through the second switch $M_{LS}$ may be generated during the on and off switching of the switch module 101. In peak current control pulse width modulation mode, the second feedback signal Vcs may be provided through sensing (e.g. by the current sensing circuit 1025) the high side switching current $I_{HS}$, or the low side switching current $I_{LS}$ or the inductor current $I_L$ flowing through the inductive power storage device Lo. Therefore, the second feedback signal Vcs is proportional to the high side switching current $I_{HS}$, or the low side switching current $I_{LS}$ or the inductor current $I_L$ and carries information of a peak value of the high side switching current $I_{HS}$, or the low side switching current $I_{LS}$ or the inductor current $I_L$. Since the output current Io can be considered as an average of the high side switching current $I_{HS}$, or the low side switching current $I_{LS}$ or the inductor current $I_L$, the high side switching current $I_{HS}$, or the low side switching current $I_{LS}$ or the inductor current $I_L$ is actually indicative of the output current Io.

The power converter 100 and the control module 102 will be described in more detail with reference to FIGS. 1-8 in the following.

In accordance with an embodiment of the present invention, the control module 102 may comprise a pulse width modulation ("PWM") module 1021, a load transient response control module 1022, a clock generation module 1023 and a logic control module 1024.

Figure 2:
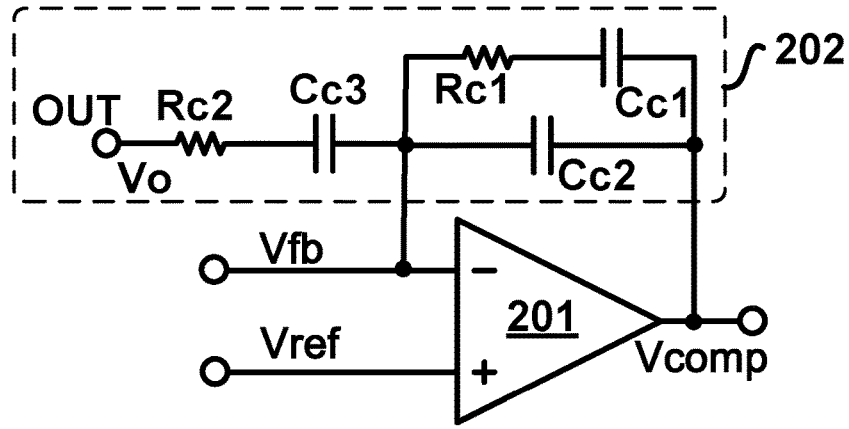
FIG. 2 illustrates a schematic diagram of a compensation module 202 according to an alternative exemplary embodiment of the present invention.

In accordance with an embodiment of the present invention, the PWM module 1021 may be configured to respectively receive the first feedback signal Vfb, the reference signal Vref and the second feedback signal Vcs, and to generate an off trigger signal OFFCTL based on the first feedback signal Vfb, the reference signal Vref and the second feedback signal Vcs. In an embodiment, PWM module 1021 is configured to operate the first feedback signal Vfb with the reference signal Vref to provide a difference signal Vcomp indicative of a difference between the first feedback signal Vfb and the reference signal Vref, and to compare the second feedback signal Vcs with the difference signal Vcomp to provide a first comparison signal C1. The first comparison signal C1 may be output as the off trigger signal OFFCTL. In the exemplary embodiment shown in FIG. 1, the PWM module 1021 is illustrated for example to comprise an operational amplifier 201, a compensation circuit 202 and a PWM comparator 203. The operational amplifier 201 may have a first amplifier input terminal (e.g. the "−" input terminal illustrated in FIG. 1) configured to receive the first feedback signal Vfb, a second amplifier input terminal (e.g. the "+" input terminal illustrated in FIG. 1) configured to receive the reference signal Vref, and an amplifier output terminal configured to provide the difference signal Vcomp. The compensation circuit 202 may be coupled between the first amplifier input terminal and the amplifier output terminal and configured to provide integral compensation to the output signal Vcomp of the operational amplifier 201. In the example of FIG. 1, the compensation circuit 202 is illustrated as to comprise a first compensation resistor Rc1 and a first compensation capacitor Cc1 coupled in series between the first amplifier input terminal and the amplifier output terminal, and a second compensation capacitor Cc2 coupled in parallel with the first compensation resistor Rc1 and the first compensation capacitor Cc1. The compensation circuit 202 illustrated in FIG. 1 may be referred to as type II compensation circuit. In an embodiment, the compensation circuit 202 may not comprise the second compensation capacitor Cc2. In this case, the compensation circuit 202 may be referred to as type I compensation circuit. In an alternative embodiment, besides the first compensation resistor Rc1, the first compensation capacitor Cc1 and the second compensation capacitor Cc2 shown in FIG. 1, the compensation circuit 202 may further comprise a second compensation resistor Rc2 and a third compensation capacitor Cc3 as illustrated in FIG. 2. The second compensation resistor Rc2 and the third compensation capacitor Cc3 may be coupled in series between the first amplifier input terminal and the amplifier output terminal. The compensation circuit 202 in this circumstance (shown in FIG. 2) may be referred to as type III compensation circuit. The PWM comparator 203 may have a first comparator input terminal (the "−" input terminal in FIG. 1) configured to receive the second feedback signal Vcs, a second comparator input terminal (the "+" input terminal in FIG. 1) configured to receive the difference signal Vcomp and a comparator output terminal configured to provide the first comparison signal C1.

In accordance with an embodiment of the present invention, still referring to FIG. 1, the load transient response control module 1022 may be configured to detect a deviation ΔVo of the output voltage Vo from its desired value, and to compare the deviation ΔVo with a first threshold Vth1 to generate a load response control signal CMP. In the example of FIG. 1, the load transient response control module 1022 is electrically coupled to the first compensation resistor Rc1 of the compensation circuit 202 and is configured to detect a voltage drop on the first compensation resistor Rc1 to provide a voltage detection signal ΔVR (referring to FIG. 1 and FIG. 3), wherein the voltage detection signal ΔVR can actually indicate the deviation ΔVo of the output voltage Vo from its desired value in real time with negligible delay, and thus responds fast to the change in the output voltage Vo. Although the difference signal Vcomp provided by the PWM module 1021 may also be able to indicate the deviation ΔVo of the output voltage Vo from its desired value, it responds relatively slow to the change in the output voltage Vo. Especially, when the output voltage Vo changes largely due to sharp change in the load 105, the difference signal Vcomp may not be able to indicate the change in the output voltage Vo in real time and its available response range is limited by the bandwidth of the operational amplifier 201. One of ordinary skill in the art can understand that the compensation circuit 202 may always comprise the first compensation resistor Rc1 no matter the type I, or type II or type III compensation is applied. Therefore, it is easy and practical to monitor the deviation ΔVo through detecting the voltage drop on the first compensation resistor Rc1.

In accordance with an embodiment of the present invention, when the load 105 suddenly gets heavier (e.g. the load 105 requires a larger output current Io), the output voltage Vo may immediately decrease. For this situation, the load transient response control module 1022 may immediately detect that the deviation ΔVo of the output voltage Vo from its desired value is lower than the first threshold Vth1 and judge that load transient change occurs, and therefore set the load response control signal CMP to have a trigger logic state (e.g. a high logic state or a high logic pulse). In contrast, if the load transient response control module 1022 detects that the deviation ΔVo of the output voltage Vo from its desired value is higher than the first threshold Vth1, it judges that load transient change does not occur, and therefore sets the load response control signal CMP to have a non-trigger logic state (e.g. a low logic state). In an embodiment, once the load response control signal CMP is at the trigger logic state, it is configured to trigger the clock generation module 1023 to reset the clock signal CLK and to trigger the logic control module 1024 to maintain the driving signal (e.g. the high side driving signal DH) to drive the main switch $M_{HS}$ on during a predetermined period Ton or during the period when the deviation ΔVo is lower than the first threshold Vth1. Should the load response control signal CMP be still at the trigger logic state (i.e. the deviation ΔVo is still lower than the first threshold Vth1) when the predetermined period Ton ends, the logic control module 1024 is configured to maintain the driving signal (e.g. the high side driving signal DH) to drive the main switch $M_{HS}$ on until the load response control signal CMP changes to the non-trigger logic state. In this way, once the load 105 suddenly gets heavier, the load transient response control module 1022 may be able to respond very fast to turn and maintain the main switch $M_{HS}$ on so as to regulate the output voltage Vo to restore to its desired value rapidly. Thus, the load transient response performance of the power converter 100 is improved. The load transient response performance generally refers to the ability of the output voltage Vo to restore to its desired value in response to transient change in the load (especially abrupt transient change in the load, for example, from no load or light load to full load). When the load response control signal CMP is at the non-trigger logic state, it does not trigger the clock generation module 1023 and the logic control module 1024. That is to say, the load response control signal CMP will not affect the operation of the clock generation module 1023 and the logic control module 1024 when it is at the non-trigger logic state.

In accordance with an embodiment of the present invention, the first threshold Vth1 carries the switching current (e.g. the high side switching current $I_{HS}$ or the low side switching current $I_{LS}$) information or the inductor current IL information. For instance, the first threshold Vth1 may increase with increase in the switching current and decrease with decrease in the switching current. In contrast, if the first threshold Vth1 is fixed, the load transient response control module 1022 and the logic control module 1024 form a negative feedback voltage control loop and control the switch module 101 with a control mode similar to constant on time control mode. This similar to constant on time control mode controlled negative feedback voltage control loop is uncompensated and two poles exist which cause the output voltage Vo to oscillate near the resonant system frequency of the power converter. In accordance with various embodiments of the present invention, with the first threshold Vth1 increasing and decreasing in the same direction as the switching current, the negative feedback voltage control loop is compensated, and thus the output voltage Vo will not oscillate and can restore to its desired value rapidly when load transient change occurs.

In accordance with an embodiment of the present invention, the first threshold Vth1 may be provided through sensing the switching current (e.g. the high side switching current $I_{HS}$ or the low side switching current $I_{LS}$) or the inductor current IL. For example, in one embodiment, the second feedback signal Vcs or a signal proportional to the second feedback signal may be used as the first threshold Vth1.

In accordance with an embodiment of the present invention, the load transient response control module 1022 may be configured to generate the first threshold Vth1 through superposing a regulatable bias Vos to a predetermined second threshold Vth2, wherein the regulatable bias Vos increases with increase in the switching current and decreases with decrease in the switching current. In an embodiment, the regulatable bias Vos may be regulated by the second feedback signal Vcs. As illustrated in FIG. 1, the load transient response control module 1022 may comprise a load transient detecting comparison circuit 209 and a threshold regulation circuit 210. The load transient detecting comparison circuit 209 may be configured to detect the deviation ΔVo of the output voltage Vo from its desired value, and to compare the deviation ΔVo with the first threshold Vth1 to provide the load response control signal CMP. The threshold regulation circuit 210 may be configured to receive the predetermined second threshold Vth2 and a threshold regulation signal proportional to the switching current, to generate the regulatable bias Vos regulated by the threshold regulation signal, and to superpose the regulatable bias Vos to the predetermined second threshold Vth2 to generate the first threshold Vth1. In an exemplary embodiment, the second feedback signal Vcs may be used as the threshold regulation signal.

Figure 3:
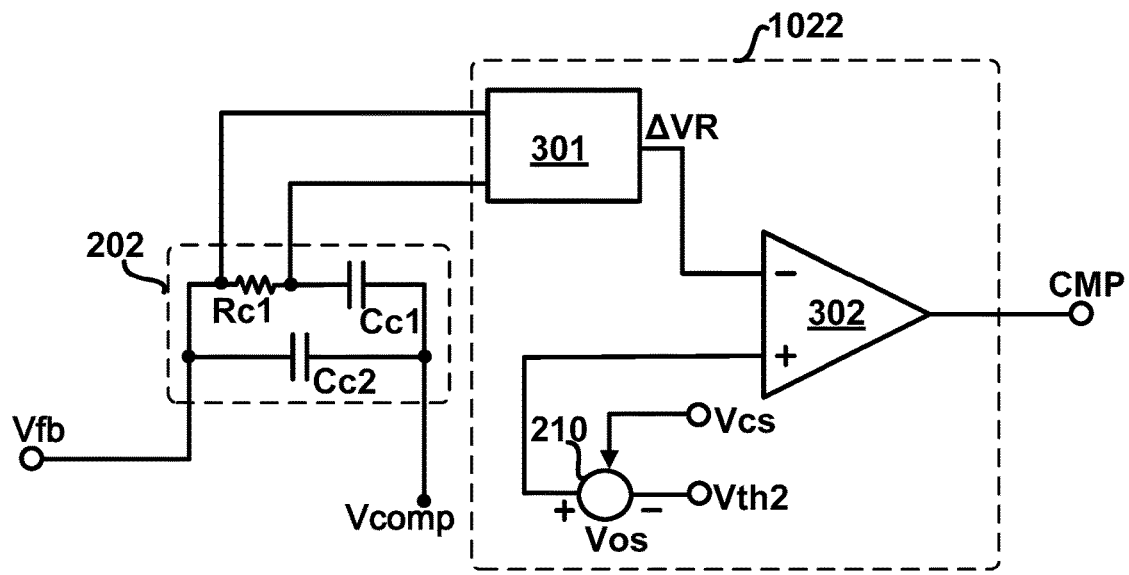
FIG. 3 illustrates a schematic diagram of a load transient response control module 1022 in accordance with an embodiment of the present invention.

FIG. 3 illustrates a schematic diagram of the load transient response control module 1022 in accordance with an embodiment of the present invention. In this exemplary embodiment, the load transient detecting comparison circuit 209 may comprise a voltage detection circuit 301 and a load transient control comparator 302. The voltage detection circuit 301 may have a first detection input terminal, a second detection input terminal and a detection output terminal, wherein the first detection input terminal is coupled to a first terminal of the first compensation resistor Rc1, the second detection input terminal is coupled to a second terminal of the first compensation resistor Rc1, and wherein the voltage detection circuit 301 is configured to detect the voltage drop on the first compensation resistor Rc1 based on the signals detected at the first detection input terminal and the second detection input terminal so as to provide the voltage detection signal ΔVR indicative of the deviation ΔVo. The voltage detection signal ΔVR in this embodiment may be expressed by ΔVR≈K*ΔVo, wherein the coefficient K is related to the resistance of the first compensation resistor Rc1 and a detection gain of the voltage detection circuit 301 etc. The voltage detection circuit 301 may comprise any suitable circuits/modules that can detect the voltage drop across the first compensation resistor Rc1 or can detect the voltages at the first and the second terminals of first compensation resistor Rc1 and then calculate the voltage drop. Such circuits/modules are well known to those skilled in the art and are thus not addressed in detail in the present disclosure. The load transient control comparator 302 may have a first comparator input terminal (e.g. the "−" input terminal in FIG. 3), a second comparator input terminal (e.g. the "+" input terminal in FIG. 3) and a comparator output terminal, wherein the first comparator input terminal is configured to receive the voltage detection signal ΔVR, the second comparator input terminal is configured to receive the first threshold Vth1, and wherein the load transient control comparator 302 is configured to compare the voltage detection signal ΔVR with the first threshold Vth1 to provide the load response control signal CMP. In accordance with an exemplary embodiment, the load response control signal CMP may have the trigger logic state (e.g. high logic state or high logic pulse) when the voltage detection signal ΔVR is lower than the first threshold Vth1, and have the non-trigger logic state (e.g. low logic state) when the voltage detection signal ΔVR is higher than the first threshold Vth1.

Figure 4:
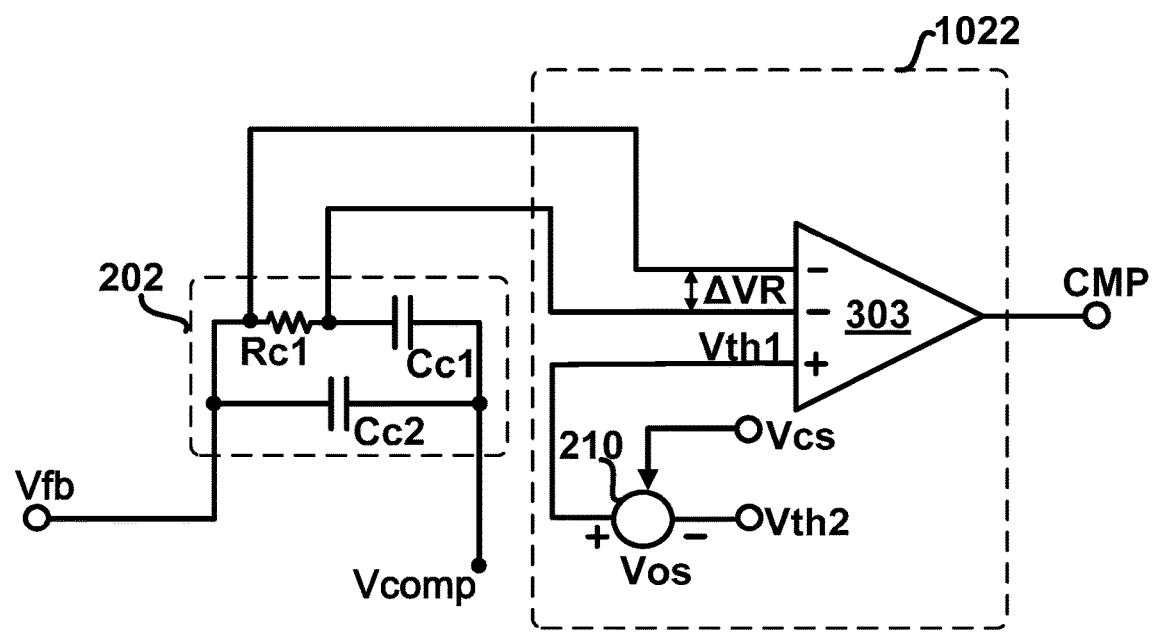
FIG. 4 illustrates a schematic diagram of a load transient response control module 1022 in accordance with an alternative embodiment of the present invention.

One of ordinary skill in the art should understand that the load transient response control module 1022 described above with reference to FIG. 3 is illustrative and not limiting, various modifications may be made without departing from the spirit of the present invention. For instance, FIG. 4 illustrates a schematic diagram of a load transient response control module 1022 in accordance with an alternative embodiment of the present invention. In the embodiment of FIG. 4, the load transient detecting comparison circuit 209 may not comprise an independent voltage detection circuit (such as the independent voltage detection circuit 301), but may comprise a comparison circuit 303 that integrates a voltage detection function to replace the combination of the voltage detection circuit 301 and the load transient control comparator 302 of FIG. 3. As shown in FIG. 4, the comparison circuit 303 may have a first comparison input terminal (e.g. the first "−" input terminal in FIG. 4), a second comparison input terminal (e.g. the second "−" input terminal in FIG. 4), a third comparison input terminal (e.g. the "+" input terminal in FIG. 4) and a comparison output terminal, wherein the first comparison input terminal is coupled to the first terminal of the first compensation resistor Rc1, the second comparison input terminal is coupled to the second terminal of the first compensation resistor Rc1, the third comparison input terminal is configured to receive the first threshold Vth1, and the output terminal is configured to provide the load response control signal CMP. The comparison circuit 303 of FIG. 4 directly monitors the voltages at both the first and the second terminals of the first compensation resistor Rc1 to provide the voltage detection signal ΔVR representing the voltage drop across the first compensation resistor Rc1, and compares the voltage detection signal ΔVR with the first threshold Vth1 so as to provide the load response control signal CMP.

In accordance with an embodiment of the present invention, the load transient detecting comparison circuit 209 may have an offset resistor Ros. For instance, in the exemplary embodiment shown in FIG. 3, the load transient control comparator 302 of the load transient detecting comparison circuit 209 may have an offset resistor Ros. In the embodiment shown in FIG. 4, the comparison circuit 303 of the load transient detecting comparison circuit 209 may have an offset resistor Ros. In accordance with an embodiment of the present invention, the regulatable bias Vos may be generated through regulating a current flowing through the offset resistor Ros.

Figure 5:
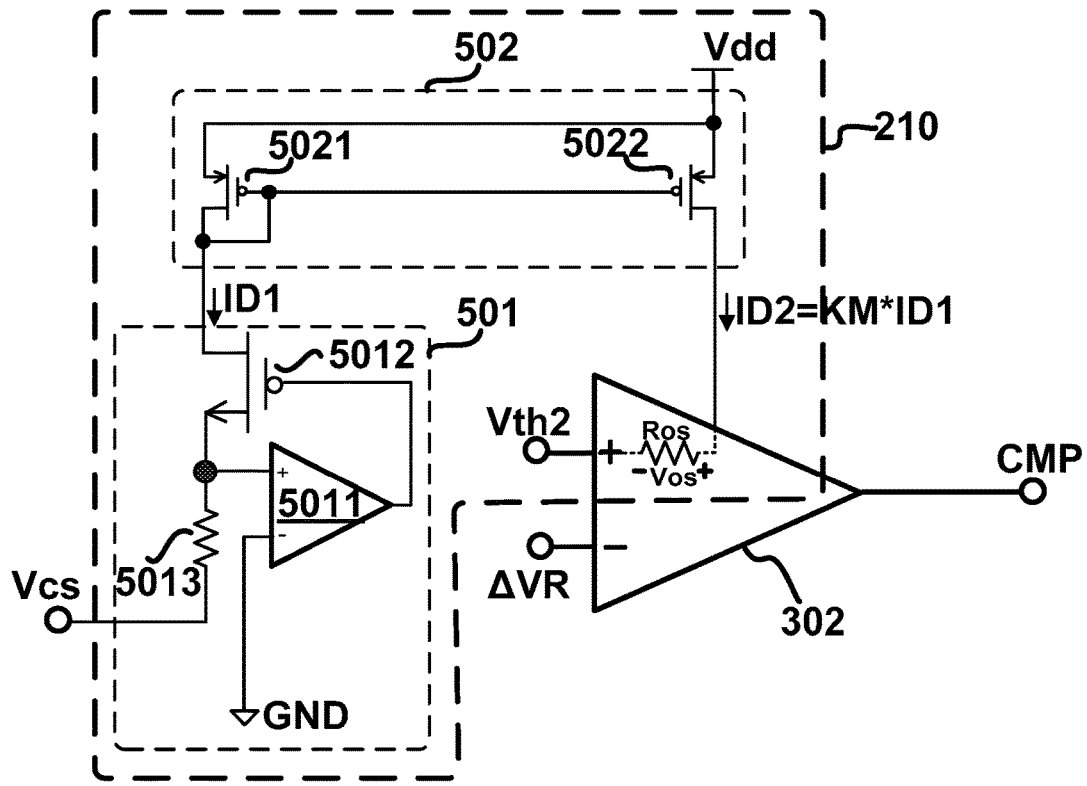
FIG. 5 illustrates a schematic block diagram of a threshold regulation circuit 210 in accordance with an embodiment of the present invention.

FIG. 5 illustrates a schematic block diagram of the threshold regulation circuit 210 in accordance with an embodiment of the present invention. The threshold regulation circuit 210 may comprise a detecting current generation circuit 501, a detecting current mirror circuit 502 and the offset resistor Ros of the load transient detecting comparison circuit 209. The detecting current generation circuit 501 is coupled to the switch module 101 or configured to receive the threshold regulation signal (e.g. the second feedback signal Vcs) to generate a detecting current ID1 that is proportional to the switching current (e.g. the high side switching current $I_{HS}$ or the low side switching current $I_{LS}$). The detecting current mirror circuit 502 is configured to receive the detecting current ID1 and to mirror the detecting current ID1 with a predetermined mirror coefficient KM to generate a mirror current ID2, i.e. ID2=KM*ID1. The offset resistor Ros is coupled to receive the predetermined second threshold Vth2 at its first terminal and is coupled to the detecting current mirror circuit 502 to receive the mirror current ID2 at its second terminal. In this way, the mirror current ID2 flows through the offset resistor Ros resulting in a voltage drop across the offset resistor Ros. The voltage drop across the offset resistor Ros functions as the regulatable bias Vos. Thus, the offset resistor Ros with such a configuration shown in FIG. 5 realizes the superposing of the regulatable bias Vos to the predetermined second threshold Vth2 to generate the first threshold Vth1. In the exemplary embodiment shown in FIG. 5, the detecting current generation circuit 501 is illustrated as to comprise a detecting resistor 5013 having a first terminal and a second terminal, a detecting amplifier 5011 having a first input terminal, a second input terminal and an output terminal and a detecting transistor 5012 having a first terminal, a second terminal and a control terminal. The first terminal of the detecting resistor 5013 is coupled to the switch module 101 or configured to receive the threshold regulation signal (e.g. the second feedback signal Vcs). The first input terminal (e.g. the "+" input terminal of 5011 shown in FIG. 5) of the detecting amplifier 5011 is coupled to the second terminal of the detecting resistor 5013. The second input terminal (e.g. the "−" input terminal of 5011 shown in FIG. 5) of the detecting amplifier 5011 is connected to the reference ground GND. The first terminal of the detecting transistor 5012 is coupled to the second terminal of the detecting resistor 5013, the control terminal of the detecting transistor 5012 is coupled to the output terminal of the detecting amplifier 5011, and the second terminal of the detecting transistor 5012 is configured to provide the detecting current ID1. The detecting current mirror circuit 502 may comprise a current mirror comprising a first mirror transistor 5021 and a second mirror transistor 5022 connected as shown in FIG. 5.

In accordance with an embodiment of the present invention, turning back to FIG. 1, the clock generation module 1023 may be configured to receive the load response control signal CMP and to regulate a clock signal CLK based on the load response control signal CMP. In an embodiment, when the load response control signal CMP is at the trigger logic state (e.g. high logic state or high logic pulse), the clock generation module 1023 is triggered to reset the clock signal CLK immediately. When the load response control signal CMP is at the non-trigger logic state (e.g. low logic state), it does not trigger the clock generation module 1023 and thus the clock signal CLK is unchanged. In an alternative embodiment, when the load response control signal CMP is at the trigger logic state (e.g. high logic state or high logic pulse), the clock generation module 1023 is triggered to reset the clock signal CLK immediately and in meanwhile to increase the frequency of the clock signal CLK from a first frequency (normal frequency) f0 to a second frequency f1, and to maintain the frequency of the clock signal CLK at the second frequency f1 in a predetermined duration ΔT. At the end of the predetermined duration ΔT, the frequency of the clock signal CLK is restored to the first frequency f0. In an alternative embodiment, when the load response control signal CMP is at the trigger logic state (e.g. high logic state or high logic pulse), the clock generation module 1023 is triggered to reset the clock signal CLK immediately and in meanwhile to increase the frequency of the clock signal CLK from a first frequency (normal frequency) f0 to a second frequency f1, and then to gradually decrease the frequency of the clock signal CLK from the second frequency f1 to the first frequency f0 throughout a predetermined duration ΔT. At the end of the predetermined duration ΔT, the frequency of the clock signal CLK is restored to the first frequency f0.

In accordance with an embodiment of the present invention, still referring to FIG. 1, the logic control module 1024 is configured to receive the off trigger signal OFFCTL, the load response control signal CMP and the clock signal CLK, and to generate a pulse width modulated signal PWM based on the off trigger signal OFFCTL and the clock signal CLK, and further to generate the driving signal (e.g. comprising the high side driving signal DH and the low side driving signal DL in FIG. 1) to drive the switch module 101 to conduct on and off switching based on the pulse width modulated signal PWM and the load response control signal CMP. In an embodiment, the logic control module 1024 is configured to trigger the driving signal (e.g. the high side driving signal DH) to turn the main switch $M_{HS}$ on in response to the clock signal CLK, and to trigger the driving signal (e.g. the high side driving signal DH) to turn the main switch $M_{HS}$ off in response to the off trigger signal OFFCTL. The logic control module 1024 is further configured to maintain the driving signal (e.g. the high side driving signal DH) to drive the main switch $M_{HS}$ on during a predetermined period Ton or during the period when the deviation ΔVo of the output voltage Vo from its desired value is lower than the first threshold Vth1 (i.e. during the period when the load response control signal CMP is at the trigger logic state) in response to the load response control signal CMP. Should the load response control signal CMP be still at the trigger logic state (i.e. the deviation ΔVo is still lower than the first threshold Vth1) when the predetermined period Ton ends, the logic control module 1024 is configured to maintain the driving signal (e.g. the high side driving signal DH) to drive the main switch $M_{HS}$ on until the load response control signal CMP changes to the non-trigger logic state.

In accordance with an embodiment of the present invention, the logic control module 1024 is configured to set the pulse width modulated signal PWM to a first logic state (e.g. high logic state) in response to each pulse of the clock signal CLK, and to set the pulse width modulated signal PWM to a second logic state (e.g. low logic state) in response to each pulse of the off trigger signal OFFCTL. In an embodiment, the pulse width modulated signal PWM is configured to trigger the high side driving signal DH to drive the main switch $M_{HS}$ on when the pulse width modulated signal PWM is at the first logic state, and to drive the main switch $M_{HS}$ off when the pulse width modulated signal PWM is at the second logic state. In the example of FIG. 1, the logic control module 1024 may comprise an RS flip-flop circuit having a set input terminal S configured to receive the clock signal CLK, a reset input terminal R configured to receive the off trigger signal OFFCTL, and a flip-flop output terminal Q configured to provide the pulse width modulated signal PWM.

In accordance with an embodiment of the present invention, the logic control module 1024 is configured to set the driving signal (e.g. the high side driving signal DH) to turn the main switch $M_{HS}$ on when the pulse width modulated signal PWM is at the first logic state or when the load response control signal CMP is at the trigger logic state. Otherwise, the control module 1024 is configured to set the driving signal (e.g. the high side driving signal DH) to turn the main switch $M_{HS}$ off. The logic control module 1024 is further configured to provide the low side driving signal DL that is logically complementary with the high side driving signal DH, i.e. when the high side driving signal DH is at the first logic state, the low side driving signal DL is at the second logic state, when the high side driving signal DH is at the second logic state, the low side driving signal DL is at the first logic state. In an embodiment, there is a dead time between the high side driving signal DH and the low side driving signal DL. During the dead time, the high side driving signal DH and the low side driving signal DL may have the same logic state to keep both the main switch $M_{HS}$ and the second switch $M_{LS}$ off.

In accordance with an embodiment of the present invention, as shown in FIG. 1, the logic control module 1024 may further comprise a logic operation circuit 205, a high side driver 207 and a low side driver 208. The logic operation circuit 205 is configured to respectively receive the pulse width modulated signal PWM and the load response control signal CMP, to conduct logic operation to the pulse width modulated signal PWM and the load response control signal CMP so as to provide a high side control signal CTL and a low side control signal $\overline{CTL}$, wherein both the high side control signal CTL and the low side control signal $\overline{CTL}$ have a first logic state (e.g. high logic state) and a second logic state (e.g. low logic state), and wherein the high side control signal CTL and the low side control signal $\overline{CTL}$ are logically complementary. That is to say, when the high side control signal CTL is at the first logic state, the low side control signal $\overline{CTL}$ is at the second logic state, when the high side control signal CTL is at the second logic state, the low side control signal $\overline{CTL}$ is at the first logic state. In an embodiment, the logic operation circuit 205 is configured to set the high side control signal CTL to the first logic state when the pulse width modulated signal PWM is at the first logic stage or the load response control signal CMP is at the trigger logic state. Otherwise, the logic operation circuit 205 is configured to set the high side control signal CTL to the second logic state. In the exemplary in embodiment of FIG. 1, the logic operation circuit 205 may comprise an OR gate configured to respectively receive the pulse width modulated signal PWM and the load response control signal CMP, and to conduct OR logic operation to the pulse width modulated signal PWM and the load response control signal CMP to generate the high side control signal CTL. The logic operation circuit 205 may further comprise an inverter configured to receive the high side control signal CTL and to invert the high side control signal CTL to generate the low side control signal $\overline{CTL}$. The high side driver 207 is configured to receive the high side control signal CTL and to generate the high side driving signal DH based on the high side control signal CTL. The low side driver 208 is configured to receive the low side control signal $\overline{CTL}$ and to generate the low side driving signal DL based on the low side control signal $\overline{CTL}$. However, this is not intended to be limiting. For instance, if the second switch $M_{LS}$ is a free-wheeling diode, the logic control module 1024 may not provide the low side driving signal DL and correspondingly the inverter and the low side driver 208 may be omitted.

Figure 6:
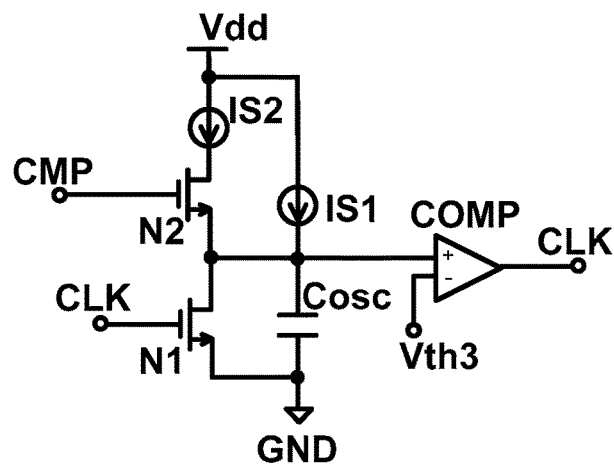
FIG. 6 illustrates a schematic block diagram of a clock generation module 1023 in accordance with an embodiment of the present invention.

FIG. 6 illustrates a schematic block diagram of the clock generation module 1023 in accordance with an embodiment of the present invention. The clock generation module 1023 may comprise a first current source IS1, an oscillation capacitor Cosc, an oscillation comparator COMP, and a first oscillation switch N1. The first current source IS1 is configured to provide a first constant current (also labeled with IS1). The oscillation capacitor Cosc may have a first capacitor terminal and a second capacitor terminal, wherein the first capacitor terminal is coupled to the first current source IS1 to receive the first constant current, the second capacitor terminal is connected to the reference ground GND. The oscillation comparator COMP may have a first comparator input terminal (e.g. the "+" input terminal in FIG. 6), a second comparator input terminal (e.g. the "−" input terminal in FIG. 6) and a comparator output terminal, wherein the first comparator input terminal is electrically coupled to the first capacitor terminal to detect a capacitor voltage Vosc at the first capacitor terminal of the oscillation capacitor Cosc, the second comparator input terminal is configured to receive a comparison threshold Vth3, the oscillation comparator COMP is configured to compare the capacitor voltage with the comparison threshold Vth3 to provide the clock signal CLK. The first oscillation switch N1 may have a first switch terminal, a second switch terminal and a switch control terminal, wherein the first switch terminal is electrically coupled to the first capacitor terminal of the oscillation capacitor Cosc, the second switch terminal is connected to the reference ground GND, and the switch control terminal is electrically coupled to the comparator output terminal of the oscillation comparator COMP to receive the clock signal CLK, and wherein the first oscillation switch N1 is driven to switch on when the clock signal CLK is at high logic level, and is driven to switch off when the clock signal CLK is at low logic level. In an exemplary embodiment, the first oscillation switch N1 may comprise a first N channel transistor (e.g. an N-channel MOSFET) having a gate operated as the switch control terminal, a drain operated as the first switch terminal and a source operated as the second switch terminal. In the example of FIG. 6, the first current source IS1, the oscillation capacitor Cosc, the oscillation comparator COMP and the first oscillation switch N1 actually constitutes an oscillation module of the clock generation module 1023. The oscillation module may be viewed as a fundamental of the clock generation module 1023 and is configured to generate the clock signal CLK with the first frequency f0 (i.e. the oscillation module determines the first frequency f0 which is also the normal operation frequency of the power converter 100 in steady state), wherein the first frequency f0 may be set by properly choosing the capacitance of the oscillation capacitor Cosc and the first constant current of the first current source IS1. However, one of ordinary skill in the art should understand that this is not intended to be limiting, the oscillation module may comprise other suitable components and may be modified according to practical requirements. One of ordinary skill in the art would also understand that the clock generation module 1023 may generally be powered by an internal voltage Vdd provided by other internal module of the power converter 100. The internal voltage Vdd may be steady and have a relatively low level (e.g. 5V or 3V etc.), which is more suitable for powering low-voltage internal devices of the power converter 100, compared to the input voltage Vin.

Continuing with FIG. 6, the clock generation module 1023 may further comprise a clock reset module. In the exemplary embodiment of FIG. 6, the clock reset module may comprise a second current source IS2 and a second oscillation switch N2. The second current source IS2 is configured to provide a second constant current (also labeled with IS2), wherein the second constant current may be larger than the first constant current. The second oscillation switch N2 may have a third switch terminal, a fourth switch terminal and a second switch control terminal, wherein the third switch terminal is electrically coupled to the second current source IS2 to receive the second constant current, the fourth switch terminal is electrically coupled to the first capacitor terminal of the oscillation capacitor Cosc, and the second switch control terminal is configured to receive the clock control signal CLKCTL. When the clock control signal CLKCTL is at the trigger logic state (e.g. high logic state or high logic pulse), the second oscillation switch N2 may be switched on and thus connecting the second current source IS2 to the first capacitor terminal of the oscillation capacitor Cosc. In this circumstance, both the first current source IS1 and the second current source IS2 charge the oscillation capacitor Cosc, making the capacitor voltage Vosc of the oscillation capacitor Cosc to rise sharply and exceed the comparison threshold Vth3 so that the comparator output terminal of the oscillation comparator COMP immediately provides a high logic pulse of the clock signal CLK in response to the clock control signal CLKCTL. Therefore, the clock signal CLK is reset immediately. When the clock control signal CLKCTL is at the non-trigger logic state (e.g. low logic state), the second oscillation switch N2 may be switched off and thus disconnecting the second current source IS2 from the first capacitor terminal of the oscillation capacitor Cosc. In an embodiment, the second oscillation switch N2 may comprise a second N channel transistor (e.g. an N-channel MOSFET) having a gate operated as the second switch control terminal, a drain operated as the third switch terminal and a source operated as the fourth switch terminal.

Figure 7:
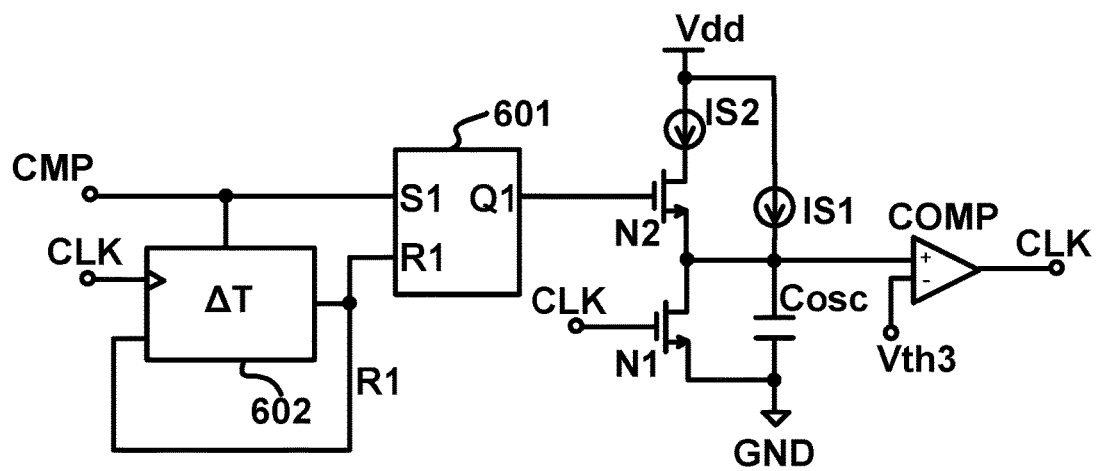
FIG. 7 illustrates a schematic block diagram of a clock generation module 1023 in accordance with an alternative embodiment of the present invention.

FIG. 7 illustrates a schematic block diagram of the clock generation module 1023 in accordance with an alternative embodiment of the present invention. Compared to the embodiment of FIG. 6, the clock generation module 1023 in the embodiment of FIG. 7 may further comprise an RS flip-flop 601 and a counter 602. The RS flip-flop 601 may have a set input terminal S1, a reset input terminal R1 and a flip-flop output terminal Q1, wherein the set input terminal S1 is configured to receive the load response control signal CMP, the reset input terminal R1 is configured to receive a reset signal (also labeled with R1) provided by the counter 602, and the flip-flop output terminal Q1 is configured to provide a control signal (also labeled with Q1) to the second control terminal of the second oscillation switch N2. The counter 602 may have an enable terminal EN, a clock input terminal CK, a reset terminal R2 and an output terminal CNO, wherein the enable terminal EN is configured to receive the load response control signal CMP, the clock input terminal CK is configured to receive the clock signal CLK, the reset terminal R2 is coupled to the output terminal CNO to receive the reset signal R1 and the output terminal CNO is configured to provide the reset signal R1. With the configuration of the clock generation module 1023 shown in FIG. 7, when the load response control signal CMP is at the trigger logic state, the RS flip-flop 601 is reset and the control signal Q1 may have a first logic state (e.g. a high logic state) so that the second oscillation switch N2 is switched on. When the second oscillation switch N2 is on, the second current source IS2 is connected to the first capacitor terminal of the oscillation capacitor Cosc and charges the oscillation capacitor Cosc together with the first current source IS1. Therefore, the oscillation capacitor Cosc may be charged faster, the frequency of the clock signal CLK is thus increased from the first frequency f0 to the second frequency f1. In the meanwhile, when the load response control signal CMP is at the trigger logic state, the counter 602 is enabled to start counting. Once the counter 602 counts that the predetermined duration ΔT has elapsed in response to the pulses of the clock signal CLK, the reset signal R1 is generated and provided at the output terminal CNO. The reset signal R1 subsequently resets the RS flip-flop 601 and the counter 602. Once the RS flip-flop 601 is reset, the control signal Q1 provided to the second oscillation switch N2 changes to a second logic state (e.g. a low logic state), driving the second oscillation switch N2 to switch off. The second current source IS2 is thus disconnected from the first capacitor terminal of the oscillation capacitor Cosc. In this way, the frequency of the clock signal CLK restores to the first frequency f0. One of ordinary skill in the art will understand that the counter 602 may be replaced with a timer in an alternative embodiment.

Figure 8:
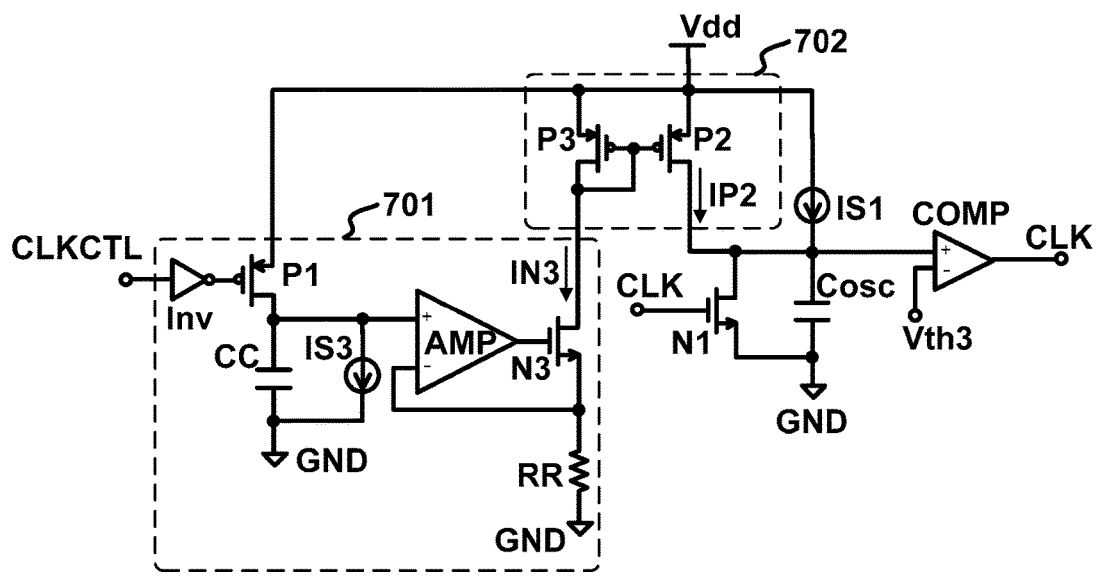
FIG. 8 illustrates a schematic diagram of a clock generation module 1023 in accordance with an alternative embodiment of the present invention.

FIG. 8 illustrates a schematic block diagram of the clock generation module 1023 in accordance with an alternative embodiment of the present invention. Compared to the embodiment of FIG. 6, the clock generation module 1023 in the embodiment of FIG. 8 may not comprise the clock reset module (e.g. the second current source IS2 and the second oscillation switch N2). Besides the oscillation module (e.g. the first current source IS1, the oscillation capacitor Cosc, the oscillation comparator COMP and the first oscillation switch N1), the clock generation module 1023 in the embodiment of FIG. 8 may further comprise a current control circuit 701 and a controllable current source 702. The configuration and working principle of the oscillation module has been described with reference to FIG. 6 and is not addressed herein. The current control circuit 701 is configured to receive the load response control signal CMP and to generate a control current IN3 in response to the trigger logic state of the load response control signal CMP, wherein the control current IN3 is gradually decreased from a predetermined current value (e.g. Vdd/RR in FIG. 8) to zero during the predetermined duration ΔT. The current control circuit 701 may exemplarily comprise an inverter Inv, a first P channel transistor P1, a control capacitor CC, a third current source IS3, a control amplifier AMP, a third N channel transistor N3 (e.g. a MOSFET) and a control resistor RR. The inverter Inv may have an input terminal configured to receive the load response control signal CMP, and an output terminal configured to provide an inversion signal of the load response control signal CMP to the gate terminal of the first P channel transistor P1. For instance, take the embodiment where the trigger logic state of the load response control signal CMP is high logic state or high logic pulse, the inversion signal output from the inverter Inv is low logic state or low logic pulse when the load response control signal CMP is at the trigger logic state. Thus, the first P channel transistor P1 may be driven to switch on by the inversion signal for a time interval substantially equivalent to the duration of the high logic level of the load response control signal CMP and to switch off when the load response control signal CMP is at the non-trigger logic state. One of ordinary skill in the art should understand that if the trigger logic state of the load response control signal CMP is low logic state or low logic pulse, the inverter Inv can be omitted. The first P channel transistor P1 is configured to receive the internal voltage Vdd at its source terminal, its drain terminal is coupled to a first capacitor terminal of the control capacitor CC. A second terminal of the control capacitor CC is connected to the reference ground GND. The control capacitor CC may be charged during the time when the first P channel transistor P1 is on and the voltage at the first capacitor terminal of the control capacitor CC may reach the internal voltage Vdd. The third current source IS3 may have a first terminal electrically coupled to the first capacitor terminal of the control capacitor CC and a second terminal electrically coupled to the second capacitor terminal of the control capacitor CC, i.e. the third current source IS3 is connected in parallel with the control capacitor CC. The third current source IS3 is provided to discharge the control capacitor CC when the first P channel transistor P1 is off. The control amplifier AMP may have a first amplifier input terminal (e.g. the "+" input terminal in FIG. 8) electrically coupled to the first capacitor terminal of the control capacitor CC, a second amplifier input terminal (e.g. the "−" input terminal in FIG. 8) electrically coupled to the source terminal of the third N channel transistor N3, and an amplifier output terminal electrically coupled to the gate terminal of the third N channel transistor N3. The control resistor RR may have a first terminal electrically coupled to the source terminal of the third N channel transistor N3 and a second terminal connected to the reference ground GND. The drain terminal of the third N channel transistor N3 is configured to provide the control current IN3. The third N channel transistor N3 is operated in its linear operation area. Therefore, while the voltage at the first capacitor terminal of the control capacitor CC is discharged from the internal voltage Vdd to zero, the control current decreases from the predetermined current value to zero correspondingly. The predetermined current value can actually be determined by the internal voltage Vdd and the control resistor RR, e. g. the predetermined current value may be expressed by Vdd/RR in the example of FIG. 8. The predetermined duration ΔT may be determined by the discharging rate of the third current source IS3 to the control capacitor CC. In the example of FIG. 8, the predetermined duration ΔT may substantially be equal to the time that it takes for the voltage at the first capacitor terminal of the control capacitor CC being discharged from the internal voltage Vdd to zero.

The controllable current source 702 may exemplarily comprise a current mirror having a mirror input terminal and a mirror output terminal, wherein the mirror input terminal is configured to receive the control current IN3, and wherein the current mirror is configured to copy the control current IN3 and to provide a mirror current IP2 at the mirror output terminal. The mirror current IP2 may substantially be equal to the control current IN3. In FIG. 8, the current mirror is illustrated to comprise a second P channel transistor P2 and a third P channel transistor P3, both having a gate terminal, a source terminal and a drain terminal. The source terminals of both the second P channel transistor P2 and the third P channel transistor P3 are connected to the internal voltage Vdd. The gate terminal of the second P channel transistor P2 is connected to the gate terminal and the source terminal of the third P channel transistor P3. The source terminal of the third P channel transistor P3 is operated as the mirror input terminal to receive the control current IN3. The source terminal of the second P channel transistor P2 is operated as the mirror output terminal to provide the mirror current IP2. The first capacitor terminal of the oscillation capacitor Cosc is electrically coupled to the mirror output terminal of the controllable current source 702 to receive the mirror current IP2. Therefore, since the moment when the load response control signal CMP is changed to the trigger logic state, the oscillation capacitor Cosc is charged by both the first current source IS1 and the mirror current IP2 during the predetermined duration ΔT, wherein the mirror current IP2 is gradually decreased from the predetermined current value (e.g. Vdd/RR in FIG. 8) to zero during the predetermined duration ΔT. Accordingly, in response to the trigger logic state of the load response control signal CMP, the frequency of the clock signal CLK is increased from the first frequency f0 to the second frequency f1 immediately, and subsequently decreased gradually from the second frequency f1 to the first frequency f0 throughout the predetermined duration ΔT so that at the end of the predetermined duration ΔT, the frequency of the clock signal CLK is restored to the first frequency f0.

One of ordinary skill in the art should understand that the clock generation module 1023 according to the embodiments described with reference to FIGS. 6-8 is illustrative and non-exclusive. Various modifications may be made without departing from the spirit of the present invention.

Figure 9:
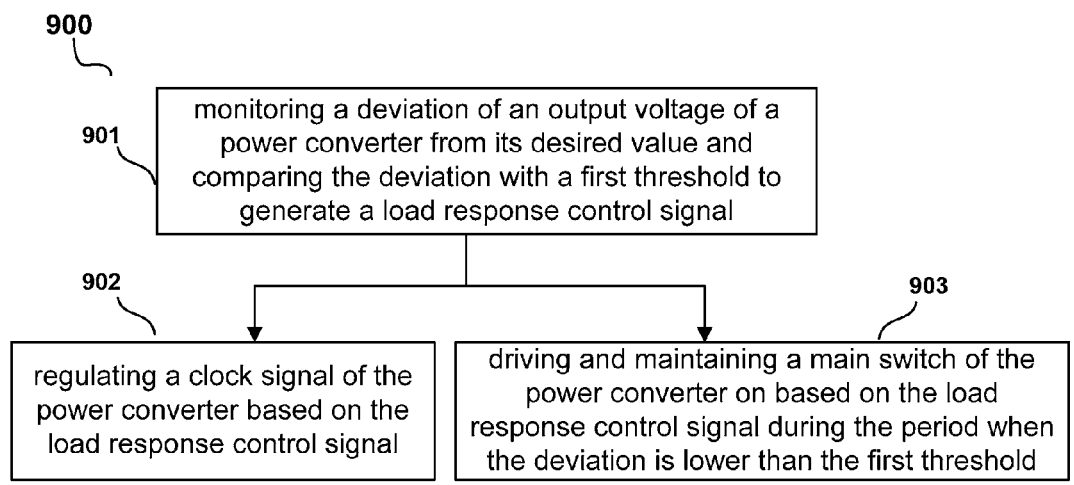
FIG. 9 illustrates a flow chart illustrating a method 900 for controlling a power converter.

FIG. 9 illustrates a flow chart illustrating a method 900 for controlling a power converter. The power converter (e.g. the power converter 100 described with reference to FIGS. 1-8) may comprise a main switch (e.g. the main switch $M_{HS}$ in FIGS. 1-8) and may be configured to convert an input voltage at an input port to an output voltage at an output port, based on driving the main switch to switch on and off. A switching current (e.g. the high side switching current $I_{HS}$ in FIGS. 1-8) flows through the main switch during the on and off switching of the main switch. The control method 900 may comprise: step 901, monitoring a deviation of the output voltage of the power converter from its desired value, and comparing the deviation with a first threshold to generate a load response control signal; step 902, regulating a clock signal of the power converter based on the load response control signal, wherein the load response control signal resets the clock signal when the deviation is lower than the first threshold; and step 903, driving and maintaining the main switch on based on the load response control signal during the period when the deviation is lower than the first threshold.

In accordance with an embodiment of the present invention, the method 900 may further comprise: regulating the first threshold based on the switching current so that the first threshold increases with increase in the switching current and decreases with decrease in the switching current. In an embodiment, the method 900 further comprises generating the first threshold by superposing a regulatable bias to a predetermined second threshold, wherein the regulatable bias increases with increase in the switching current and decreases with decrease in the switching current.

In accordance with an embodiment of the present invention, at step 901, comparing the deviation with the first threshold may comprise: providing a load transient detecting comparison circuit having a regulatable bias which increases with increase in the switching current and decreases with decrease in the switching current; detecting or receiving the deviation of the output voltage from its desired value at a first input terminal of the load transient detecting comparison circuit; receiving the predetermined second threshold at a second input terminal of the load transient detecting comparison circuit, and superposing the regulatable bias to the predetermined second threshold to generate the first threshold; and comparing the deviation with the first threshold through the load transient detecting comparison circuit to generate the load response control signal.

The advantages of the various embodiments of the present invention are not confined to those described above. These and other advantages of the various embodiments of the present invention will become more apparent upon reading the whole detailed descriptions and studying the various figures of the drawings.

From the foregoing, it will be appreciated that specific embodiments of the present invention have been described herein for purposes of illustration, but that various modifications may be made without deviating from the technology. Many of the elements of one embodiment may be combined with other embodiments in addition to or in lieu of the elements of the other embodiments. Accordingly, the present invention is not limited except as by the appended claims.

What is claimed is:
1. A power converter, comprising:
an input port configured to receive an input voltage;
an output port configured to provide an output voltage;
a switch module comprising a main switch configured to switch on and off in response to a driving signal to convert the input voltage into the output voltage, a switching current flowing through the switch module during the on and off switching of the switch module;
a pulse width modulation module configured to respectively receive a first feedback signal indicative of the output voltage, a reference signal indicative of a desired value of the output voltage and a second feedback signal indicative of the switching current, and to generate an off trigger signal based on the first feedback signal, the reference signal and the second feedback signal;
a load transient response control module configured to detect a deviation of the output voltage from the desired value of the output voltage, and to compare the deviation with a first threshold to generate a load response control signal;
a clock generation module, configured to provide a clock signal and to reset the clock signal in response to the load response control signal when the deviation is lower than the first threshold; and
a logic control module configured to receive the off trigger signal, the load response control signal and the clock signal, and to generate a pulse width modulated signal based on the off trigger signal and the clock signal, and further to generate the driving signal based on the pulse width modulated signal and the load response control signal; wherein the logic control module is further configured to trigger the driving signal to turn the main switch on in response to the clock signal, and to trigger the driving signal to turn the main switch off in response to the off trigger signal; and wherein the logic control module is further configured to maintain the driving signal to drive the main switch on during the period when the deviation is lower than the first threshold in response to the load response control signal.

2. The power converter of claim 1, wherein the first threshold increases with increase in the switching current and decreases with decrease in the switching current.

3. The power converter of claim 1, wherein the load transient response control module is further configured to generate the first threshold through superposing a regulatable bias to a predetermined second threshold, wherein the regulatable bias is regulated to increase with increase in the switching current and to decrease with decrease in the switching current.

4. The power converter of claim 1, wherein the load transient response control module comprises:
    a load transient detecting comparison circuit configured to detect the deviation of the output voltage from the desired value of the output voltage, and to compare the deviation with the first threshold to provide the load response control signal; and
    a threshold regulation circuit configured to receive a predetermined second threshold and a threshold regulation signal proportional to the switching current, to generate a regulatable bias regulated by the threshold regulation signal, and to superpose the regulatable bias to the predetermined second threshold to generate the first threshold.

5. The power converter of claim 4, wherein the threshold regulation signal comprises the second feedback signal.

6. The power converter of claim 4, wherein the load transient detecting comparison circuit has an offset resistor, and wherein the threshold regulation circuit comprises:
    a detecting current generation circuit coupled to the switch module or configured to receive the threshold regulation signal to generate a detecting current proportional to the switching current;
    a detecting current mirror circuit configured to receive the detecting current and to mirror the detecting current with a predetermined mirror coefficient to generate a mirror current; and
    the offset resistor configured to receive the predetermined second threshold and the mirror current respectively at its first terminal and its second terminal, and to provide a voltage drop across the offset resistor generated by the mirror current flowing through the offset resistor as the regulatable bias so as to realize the superposing of the regulatable bias to the predetermined second threshold to generate the first threshold.

7. The power converter of claim 6, wherein the detecting current generation circuit comprises:
    a detecting resistor having a first terminal and a second terminal, wherein the first terminal of the detecting resistor is coupled to the switch module or configured to receive the threshold regulation signal;
    a detecting amplifier having a first input terminal, a second input terminal and an output terminal, wherein the first input terminal of the detecting amplifier is coupled to the second terminal of the detecting resistor, and the second input terminal of the detecting amplifier is connected to the reference ground; and
    a detecting transistor having a first terminal, a second terminal and a control terminal, wherein the first terminal of the detecting transistor is coupled to the second terminal of the detecting resistor, the control terminal of the detecting transistor is coupled to the output terminal of the detecting amplifier, and the second terminal of the detecting transistor is configured to provide the detecting current.

8. The power converter of claim 1, wherein the pulse width modulation module comprises:
    an operational amplifier having a first amplifier input terminal configured to receive the first feedback, a second amplifier input terminal configured to receive the reference signal, and an amplifier output terminal configured to provide a difference signal indicative of a difference between the first feedback signal and the reference signal;
    a compensation circuit comprising a first compensation resistor and a first compensation capacitor coupled in series between the first amplifier input terminal and the amplifier output terminal; and
    a pulse width modulation comparator having a first comparator input terminal configured to receive the second feedback signal, a second comparator input terminal configured to receive the difference signal and a comparator output terminal configured to provide the off trigger signal.

9. The power converter of claim 8, wherein the load transient response control module is coupled to the compensation circuit to detect a voltage drop on the first compensation resistor and to provide a voltage detection signal indicative of the voltage drop on the first compensation resistor as the deviation of the output voltage from the desired value.

10. The clock module of claim 8, wherein the clock generation module is configured to vary a frequency of the clock signal in response to the clock control signal during a predetermined duration once the deviation of the output voltage exceeds the first predetermined threshold window.

11. The power converter of claim 1, wherein once the deviation of the output voltage is lower than the first threshold, the clock generation module is configured to increase the frequency of the clock signal immediately in response to the load response control signal from a first frequency to a second frequency, and to maintain the frequency of the clock signal at the second frequency throughout a predetermined duration, and to regulate and restore the frequency of the clock signal to the first frequency at the end of the predetermined duration.

12. The power converter of claim 1, wherein once the deviation of the output voltage is lower than the first threshold, the clock generation module is configured to increase the frequency of the clock signal immediately in response to the load response control signal from a first frequency to a second frequency and to regulate the frequency of the clock signal to gradually decrease from the second frequency to the first frequency throughout a predetermined duration.

13. The power converter of claim 1, wherein:
    the load transient response control module is configured to set the load response control signal at a trigger logic state when the deviation is lower than the first threshold and to set the load response control signal at a non-trigger logic state when the deviation is higher than the first threshold; and wherein
    the logic control module is further configured to set the pulse width modulated signal to a first logic state in response to each pulse of the clock signal, and to set the pulse width modulated signal to a second logic state in response to each pulse of the off trigger signal; and wherein
    the logic control module is further configured to set the driving signal to turn the main switch on when the pulse width modulated signal is at the first logic state or when the load response control signal is at the trigger logic state.

14. A method for controlling a power converter, wherein the power converter comprising a switch module including a main switch configured to switch on and off to convert an input voltage to an output voltage; and wherein the method comprising:

monitoring a deviation of the output voltage from its desired value, and comparing the deviation with a first threshold to generate a load response control signal;

regulating a clock signal of the power converter in response to the load response control signal once the deviation is lower than the first threshold;

driving and maintaining the main switch on based on the load response control signal during the period when the deviation is lower than the first threshold; and regulating the first threshold based on a switching current flowing through the switch module so that the first threshold increases with increase in the switching current and decreases with decrease in the switching current.

15. The method of claim 14, further comprising:

generating the first threshold by superposing a regulatable bias to a predetermined second threshold, wherein the regulatable bias increases with increase in the switching current and decreases with decrease in the switching current.

16. The method of claim 14, wherein comparing the deviation with the first threshold comprises:

providing a load transient detecting comparison circuit having a regulatable bias which increases with increase in the switching current and decreases with decrease in the switching current;

detecting or receiving the deviation of the output voltage from its desired value at a first input terminal of the load transient detecting comparison circuit;

receiving the predetermined second threshold at a second input terminal of the load transient detecting comparison circuit, and superposing the regulatable bias to the predetermined second threshold to generate the first threshold; and comparing the deviation with the first threshold through the load transient detecting comparison circuit to generate the load response control signal.

* * * * *